Patented May 11, 1937

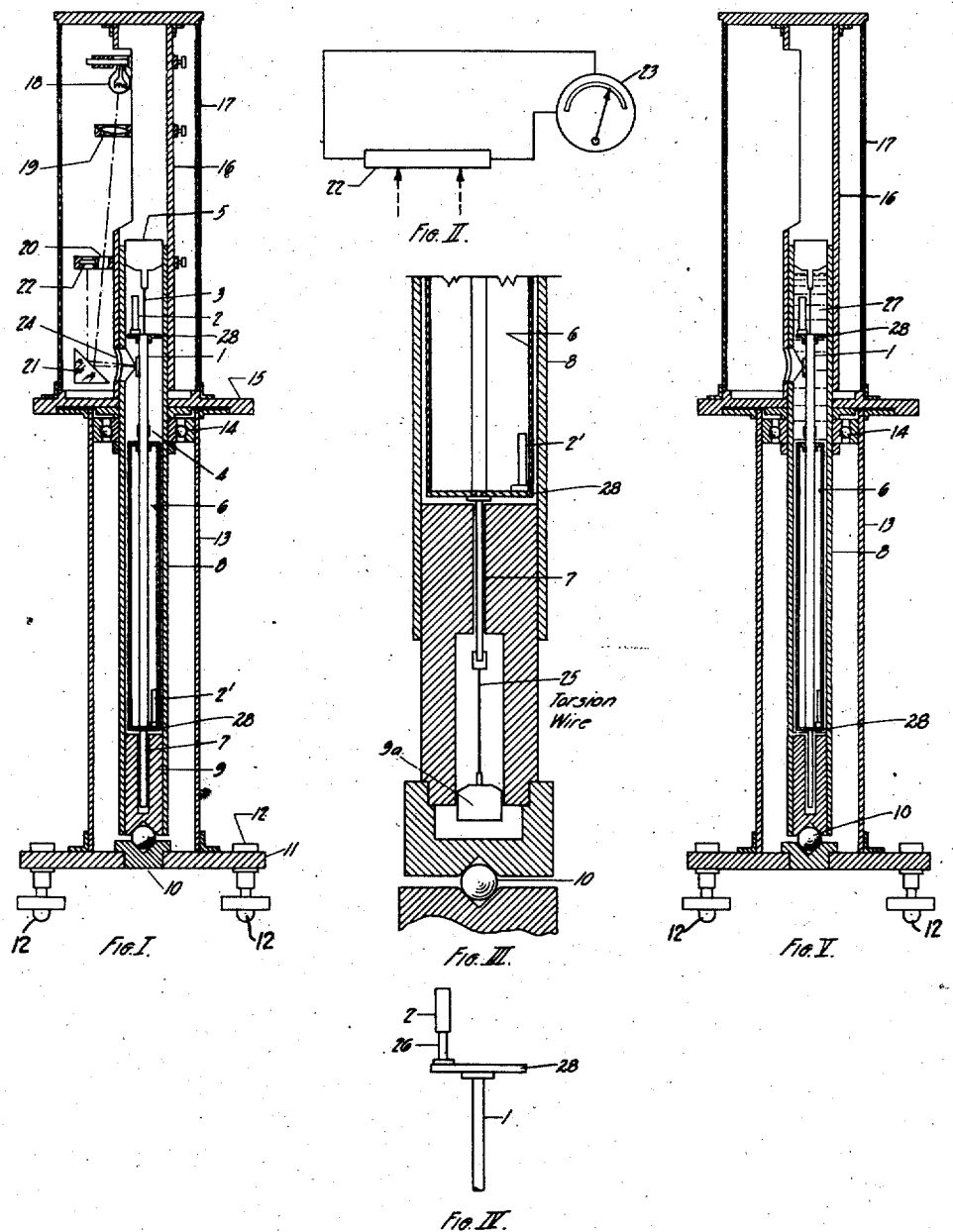

2,080,062

UNITED STATES PATENT OFFICE 2,080,062

TORSION BALANCE

Henry Rainbow, The Hague, Netherlands, assignor to Naamlooze Vennootschap De Bataafsche Petroleum Maatschappij, The Hague, Netherlands, a Dutch company Application September 8, 1934, Serial No. 743,203
In the Netherlands September 13, 1933

8 Claims. (Cl. 265—1.5)

This invention relates to a torsion balance according to Eötvös' design which as is well known consists in principle of a horizontal beam, suspended at its mid-point from a torsion thread and having equal weights attached at its ends at different levels. When the system thus formed is placed in a nonuniform gravity field it is subject to a force couple which tends to rotate the beam about the axis of the suspending thread, a counteracting couple being thereby elicited in this thread by torsion.

The angle of rotation of the beam under the influence of the two couples then supplies a measure for the variation of the field of gravity.

A requirement of paramount importance in such a balance is that of sensitiveness. A certain variation of the field of gravity has to cause a sufficiently large, measurable deflection of the beam. Moreover, it is of great practical importance that the period of oscillation of the system be not too long, in order that only the shortest possible time will be required for a single observation. The said period can be reduced by shortening the horizontal distance between the weights, which however, entails a decreased sensitiveness. In itself this is not a very great drawback, as it can be overcome by a refinement of the device for measuring the deflection of the beam. However, the shortening of the horizontal distance between the weights also has the result that the disturbances due to micro-seismic vibrations of the earth i. e. the extremely small transversal vibrations resulting from various causes begin to exert their influence and owing to the unequal level of the pendulum weights impart to the beam a rotatory movement to the extent of making it impossible to register the deflection.

The object of the invention is to devise a beam with a short period of oscillation and a small horizontal distance between the weights which nevertheless allows an accurate registration of the deflection to be made. This object is attained by the application of measures for eliminating from the registration the action of secondary oscillatory movements caused by micro-seismic vibrations of the earth.

These measures may consist either in applying a system of registration insensitive to the oscillations of short period caused by the vibrations of the earth and reacting only to the median position determined by the field of gravity about which these oscillations are effected, or in applying means which render the pendulum itself insensitive to the said vibrations. A reduction of the horizontal distance between the weights makes it possible to place the pendulum in a housing of simple shape e. g. cylindrical, whereby the disturbing action on the pendulum of currents of air within the pendulum housing is largely avoided.

The invention is illustrated in the accompanying drawings of which,

Fig. I is a vertical cross section of a balance.

Fig. II is a diagrammatic view of the registering device.

Fig. III is a vertical section of lower portion of a balance showing an alternate method of suspending the beam.

Fig. IV is a side view of upper part of the beam showing an alternate method of attaching weights to the beam.

Fig. V is a vertical section of a balance suspended in a dampening liquid.

Referring to Figure I the beam (1) consists of a tubular part carrying platforms (28) on the upper and lower parts on which the weights (2) and (2') are placed diametrically opposite each other. The beam is suspended by a torsion thread (3) which at the lower end is attached to the beam by a clamp (4) and at the top is clamped by a head (5). This head is fixed to the upper part of the cylindrical housing (8) containing the beam (1). The diameter of the cylinder (6) forming part of the beam is such as to leave a narrow space between the cylinder (6) and the wall of the housing (8) whereby a dampening action is exerted on the oscillations of the pendulum by reason of the air cushion between the cylinder and the housing (8).

A flat plate (7) at the bottom of the pendulum serves as a further dampening agent by reason of the air cushion between the plate and the plug (9). In Figure I the plate (7) extends at right angles to the vertical section shown and fits in a cross slit in plug (9) closing the housing (8) at the bottom. The housing (8) is integral with table (15), cylinder (16) and housing (17). The housing (17) contains the device for the optical determination of the position of the beam with regard to the housing (17). This device comprises an electric light (18), a lens (19) for concentrating the light, an opening (20) for transmission of a ray of light, a prism (21) for transferring this ray to the mirror (24) attached to the pendulum and a thermocouple (22) for receiving the reflected ray. It will be clear that upon a rotation of the pendulum with regard to the housing, the reflected ray will move in a plane normal to the plane of the drawings. In Figure II the thermocouple (22) is shown as being electrically connected to a galvanometer (23). The reflected ray is shown in two positions. The thermocouple (22) is of a type having two junctions i. e. two end strips of the same metal are separated by a middle strip of a dissimilar metal. In practice I have found that a thermocouple of the type described in "Zeitschrift des Vereins deutscher Ingenieure" vol. 77, page 1290, has proven very satisfactory.

The heat evolved by the reflected ray generates an electric current in the thermocouple, the intensity of which depends upon the point of impact of the ray, so that the deflection of the galvanometer indicates the deflection of the pendulum. It is of essential importance that the inertia of the registration device prevent the registration by the galvanometer of the movements of very short period about a median position resulting from the micro-seismic vibrations of the earth so that the galvanometer only registers the median position itself. The necessary amount of inertia is particularly present in a galvanometer with a long period of oscillation of its own. The thermocouple also has a favorable influence in this respect. The housing (17) is carried by the under-frame (13) of which the base (11) can be put in the desired position by means of adjusting screws (12). The housing is arranged so that it can be rotated with respect to the base (11) and under frame (13) by means of ball support (10) and ball bearing (14). This enables further observations on the same location to be made with an altered position of the beam.

In order to eliminate the oscillations due to the micro-seismic vibrations of the earth the following additional measures may be taken either separately or together.

The pendulum may be immersed in a liquid as shown for example at (27) in Figure V. The dampening action thus obtained will counteract transversal and consequently rotational oscillations. Besides providing a torsion thread at the top of the beam, a torsion thread may be provided at the bottom of the beam as for example, shown in Figure III in which numeral (25) represents a torsion thread connecting the flat plate (7) to a plug (9a) of modified shape. Finally the upper weight (2) can be attached to the pendulum by means of an elastic member allowing this weight to move in a plane at right angles to that through the two weights. This may be effected for example as shown in Figure IV in which the weight (2) is attached to the beam (1) by means of leaf spring (26). Dynamically the attachment of this weight may, by a correct choice of the elastic member approach the result obtained by suspension from a thread of such length as would cause both weights to be at the same level. As a consequence when applying this method a transversal oscillation will no longer bring about rotation.

What I claim is:

1. A torsion balance comprising a balance beam, a torsion suspension for said beam, a couple of weights carried by said beam, a substantially cylindrical housing for said beam, and a cylindrical member carried by said beam, the relation between the outer diameter of the said member and the inner diameter of said housing being such that the cylindrical member is adapted to move with little play in the cylindrical housing.

2. A torsion balance according to claim 1 in which the beam carries a vertical, diametrically directed plate, the housing being provided with a correspondingly shaped space, in which the plate is adapted to move with little play.

3. A torsion balance comprising a beam, a torsion suspension for said beam, a couple of horizontally and vertically spaced weights carried by said beam, the upper weight being connected to the beam by means of a spring allowing this weight to move in a plane perpendicular to the vertical plane passing through the two weights.

4. A torsion balance comprising a substantially cylindrical housing, a beam within said housing and a torsion thread by means of which the beam is suspended, the said beam consisting in a central tubular part, the axis of which coincides with the axis of the torsion thread, a disc-like platform carried at each end of the tubular part, and a weight fixed to each platform in such a manner that the weights are positioned at opposite sides of the tubular part.

5. A torsion balance according to claim 4, in which a hollow cylinder is fixed to the beam coaxially with the tubular part thereof, the outer diameter of said cylinder being slightly smaller than the inner diameter of the housing of the balance.

6. A torsion balance according to claim 4, in which the lower platform of the beam carries a downwardly directed vertical plate comprising the axis of the tubular part of the beam, and in which the housing has at its lower end an internal cavity, the walls of which surround the said plate with a relatively small clearance.

7. A torsion balance comprising a balance beam, a torsion suspension for said beam, two weights carried by said beam, a substantially cylindrical housing for said beam, a cylindrical member carried by said beam, the relation between the outer diameter of the said member and the inner diameter of said housing being such that the cylindrical member is adapted to move with little play in the cylindrical housing and dampening liquid filling the space between said housing and said cylindrical member.

8. A torsion balance comprising a substantially cylindrical housing, a beam within said housing, a torsion thread by means of which the beam is suspended, said beam consisting of a central tubular part, the axis of which coincides with the axis of said torsion balance, a platform at each end of said tubular part, a weight attached to each platform in such manner that the said weights are positioned on opposite sides of the tubular part, and a dampening liquid in said housing completely immersing said beam.

HENRY RAINBOW.